United States Patent
Wu

(10) Patent No.: US 6,399,245 B1
(45) Date of Patent: Jun. 4, 2002

(54) ELECTROCHEMICAL CELL WITH AN ANODE CONTAINING SULFUR

(75) Inventor: Jianjun Wu, Fairview Park, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 62 days.

(21) Appl. No.: 09/598,109

(22) Filed: Jun. 21, 2000

(51) Int. Cl.$^7$ .............................. H01M 6/04; H01M 4/48
(52) U.S. Cl. ..................... 429/206; 429/229; 429/231
(58) Field of Search .............................. 429/229, 206, 429/230, 231

(56) References Cited

U.S. PATENT DOCUMENTS

| | | | |
|---|---|---|---|
| 2,871,281 A | | 1/1959 | Moulton et al. |
| 3,507,696 A | * | 4/1970 | Jackovitz et al. ............ 429/206 |
| 3,649,362 A | | 3/1972 | Steffensen et al. |
| 3,853,624 A | * | 12/1974 | Brown et al. ................ 429/221 |
| 4,078,125 A | * | 3/1978 | Brown ........................ 429/219 |
| 4,207,383 A | * | 6/1980 | Oliapuram .................. 429/221 |

OTHER PUBLICATIONS

Seshadri, G., H.C. Xu, and J.A. Kelber, Sulfur Catalyzed Electrochemical Oxidation of Copper: A Combined Ultra-high Vacuum Electrochemistry Study, Journal of The Electrochemical Society, 146 (5) 1762–1765 (1999).

* cited by examiner

*Primary Examiner*—Laura Weiner
(74) *Attorney, Agent, or Firm*—Stewart A. Fraser; Robert W. Welsh

(57) ABSTRACT

An electrochemical cell is provided that comprises an anode comprising a zinc alloy active material and elemental sulfur. Also provided is a method of making an electrochemical cell comprising the steps of providing a cathode, an electrolyte, and an anode, adding elemental sulfur to the anode, and putting the anode and cathode in contact with the electrolyte.

18 Claims, 1 Drawing Sheet

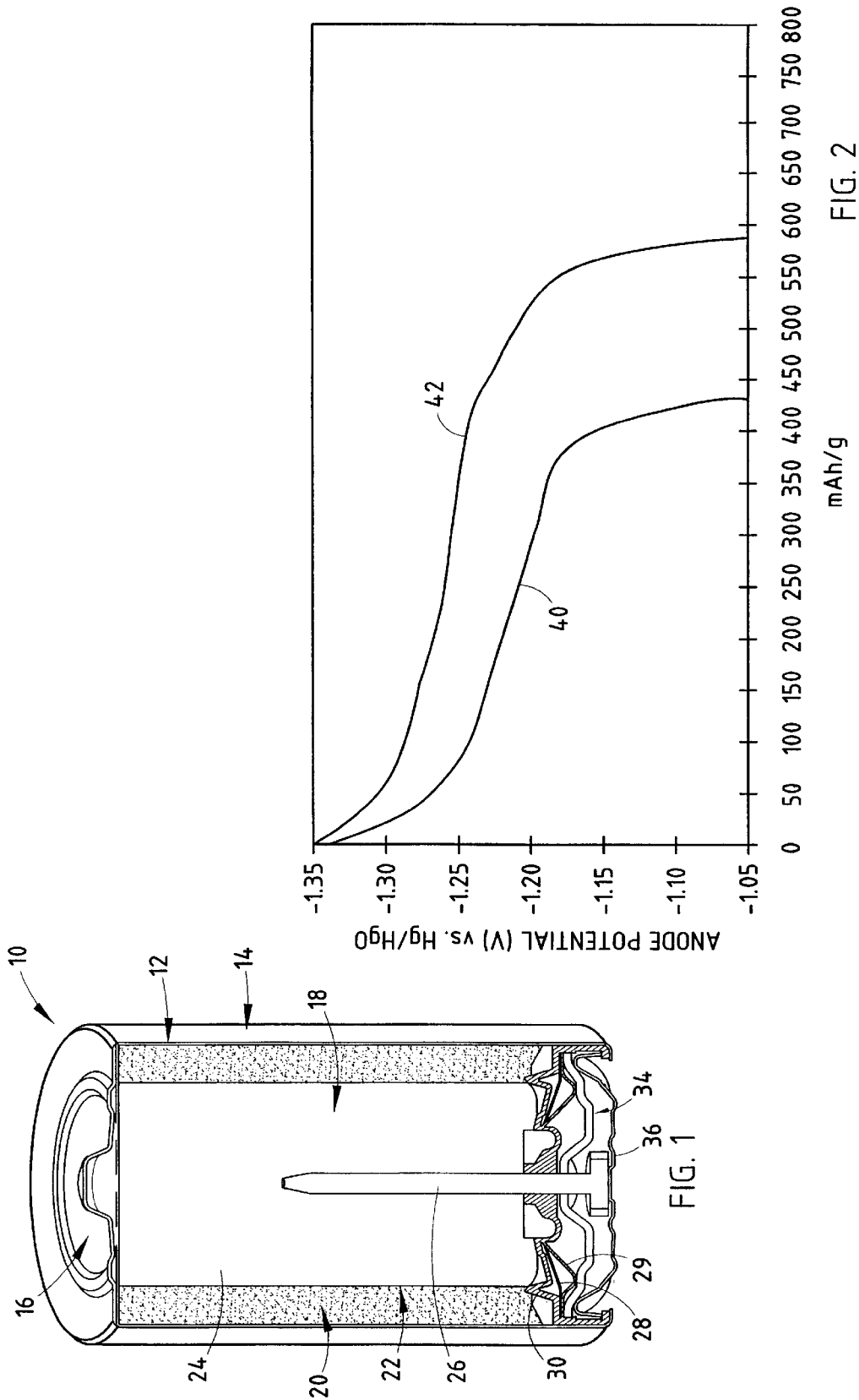

ELECTROCHEMICAL CELL WITH AN ANODE CONTAINING SULFUR

BACKGROUND OF THE INVENTION

Conventional alkaline cells generally include a steel cylindrical can having a cathode comprising manganese dioxide as the active material and formed on the interior surface of the steel can, an anode comprising zinc powder as the active material and located in the center of the cell, a separator located between the anode and the cathode, and an alkaline electrolyte solution simultaneously contacting the anode, cathode, and the separator. A conductive current collector is commonly inserted into the anode active material and a seal assembly provides closure to the top end of the steel can.

A goal in designing alkaline batteries is to increase the discharge efficiency of the zinc when the battery is discharged at a high drain rate. In conventional batteries, the discharge efficiency of the zinc is generally low when the battery is discharged at a high rate. For example, alkaline batteries currently on the market utilize only approximately 20–30% of the zinc in the cell when the cell is discharged at a high drain rate.

Electrochemical cell manufacturers and consumers desire an electrochemical cell with better performance, and therefore, there is an ongoing need for better performing electrochemical cells that are low in cost. One way to achieve better performance of an electrochemical cell is to increase the zinc utilization.

SUMMARY OF THE INVENTION

The present invention improves the discharge service performance, especially at a high drain rate, of an electrochemical cell by the inclusion of elemental sulfur in the anode of the cell.

One aspect of the present invention is an electrochemical cell comprising an alkaline electrolyte and an anode having an electrochemically active material and elemental sulfur.

Another aspect of the present invention is a method of constructing an electrochemical cell comprising the steps of providing a cathode, an alkaline electrolyte, and an anode, and adding elemental sulfur to the anode.

These and other features, advantages and objects of the present invention will be further understood and appreciated by those skilled in the art by reference to the following specification, claims, and appended drawings.

BRIEF DESCRIPTION OF THE DRAWINGS

FIG. 1 is a cutaway perspective view of an alkaline electrochemical cell that may employ an anode having elemental sulfur in accordance with the present invention; and FIG. 2 is a graph comparing the discharge curves of a zinc anode without sulfur to a zinc anode having elemental sulfur therein when evaluated in a flooded test cell.

DETAILED DESCRIPTION OF PREFERRED EMBODIMENT

Referring to FIG. 1, a cut away view of a cylindrical alkaline electrochemical cell 10 is shown. Alkaline cell 10 includes a steel can 12 having a cylindrical shape with a closed top end and an open bottom end, as oriented in FIG. 1. A metalized, plastic film label 14 is formed about the exterior surface of steel can 12, except for the ends of steel can 12. At the closed end of steel can 12 is a positive cover 16 preferably formed of plated steel. Film label 14 is formed over the peripheral edge of positive cover 16. A cathode 20, preferably formed of a mixture of manganese dioxide, graphite, a 45% potassium hydroxide solution, water, an aqueous TEFLON® solution comprising approximately 20% polytetrafluoroethylene, and additives, is formed about the interior surface of steel can 12. A separator 22, which is preferably formed of a nonwoven fabric that prevents migration of any solid particles in the cell, is disposed about the interior surface of cathode 20. An alkaline electrolyte 24, preferably formed of an aqueous solution of potassium hydroxide (KOH), is disposed in the can 12, preferably within the interior of separator 22. An anode 18, preferably formed of a mixture of zinc powder, a gelling agent, electrolyte, and additives as discussed below, is disposed within the interior of separator 22 and in contact with a current collector 26, which may include a brass nail. Accordingly, cathode 20 is configured as the positive electrode of the cell and the anode 18 is configured as the negative electrode of the cell.

Current collector 26 contacts a cover 36 at the open end of steel can 12. A nylon seal 30 is formed at the open end of steel can 12 to prevent leakage of the active materials contained in steel can 12. Nylon seal 30 contacts a Belleville washer 28 and an inner cell cover 34, which is preferably formed of steel. Below Belleville washer 28 in FIG. 1 is a toothed washer 29. Negative cover 36, which is preferably formed of plated steel, is disposed in contact with current collector 26. Negative cover 36 is electrically insulated from steel can 12 by nylon seal 30. The cathode 20 of the present invention is preferably formed of electrolytic manganese dioxide (EMD) as the electrochemically active material. In addition, the cathode 20 of the present invention may also contain one or more cathode additives.

The anode 18 of the present invention preferably contains zinc alloy powder as the electrochemically active material, most preferably an alloy of zinc, bismuth (100 ppm), indium (200 ppm), and aluminum (100 ppm), and elemental sulfur as discussed in more detail below. According to the present invention, anode 18 of electrochemical cell 10 contains elemental sulfur, which is preferably added to the anode mixture. The elemental sulfur comprises from about 0.015% to about 0.30% by weight of the zinc. Preferably, the sulfur comprises from about 0.03% to about 0.15% by weight of the zinc, more preferably from about 0.06% to about 0.09% by weight of the zinc, and most preferably comprises 0.075% by weight of the zinc. In the preferred embodiment, an anode mixture is prepared that contains 67% by weight of the combination of zinc and elemental sulfur; and 33% by weight of the combination of electrolyte, binder, and other additives. The electrolyte is preferably a 37% by weight aqueous solution of KOH.

It is contemplated that other anode formulations, cathode formulations, electrolyte formulations, and separators may be used in accordance with the present invention.

A "flooded test cell" is a test vehicle used to determine the discharge efficiency of an electrochemically dischargeable material such as zinc. The objective of using a flooded test cell is to create a physical environment in which the discharge efficiency of one electrode can be measured without interference from the battery's other components.

As used herein, the flooded test cell includes a plastic rod-shaped container that measures three and one-quarter inches in height and three inches in diameter. This container defines a centrally located circular cavity measuring two and one-quarter inches deep and one inch in diameter. Construction and discharge of the flooded test cell involves the following steps. First, a two and one-quarter inch wide strip of nickel screen is coiled and then inserted against the inner surface of the cavity. A nickel strip, known hereafter as the positive lead, is secured to the nickel screen. Second, one end of a rod-shaped brass current collector is secured to and through the bottom of the container such that the collector is centrally located in the center of the cavity. A nickel strip, known hereafter as the negative lead, is secured to the brass current collector where it extends through the bottom of the container. Third, a strip of nylon mesh, coiled to form a cylinder approximately one-quarter of an inch in diameter and one and one-eighth inches in height, is inserted into the cavity defined by the nickel screen so that the current collector extends along the center of the coiled mesh. A gap of approximately 0.35 inches separates the nylon mesh from the nickel screen along the entire height of the cavity defined by the container. Fourth, an anode mixture, typically 2 grams, is disposed within the cavity defined by the nylon mesh. Electrical contact between the zinc in the anode mixture and the current collector is readily established. Fifth, a caustic electrolyte is poured into the space between the nickel screen and nylon mesh. The electrolyte, which floods the space between the anode mixture and nickel screen, fills essentially all voids in the anode mixture, nickel screen and nylon mesh. The aqueous electrolyte contains 37% by weight KOH and a quantity of ZnO, which is dissolved in the 37% KOH solution and is equivalent to 3% by weight of the 37% KOH solution.

After assembly of the flooded test cell, the positive and negative leads are connected to the appropriate discharge equipment and the voltage of the test cell is recorded as the zinc is discharged. The discharge efficiency of the zinc may then be calculated.

The performance characteristics of a zinc anode "flooded test cell" with 0.075 weight percent elemental sulfur based on the weight of zinc were compared to that of a "control" zinc anode. The anode mixtures for both the control and for the anode containing elemental sulfur were as follows:

TABLE I

| Component | Control Cells (wt %) | Experimental Cells (wt %) |
|---|---|---|
| Zinc alloy (Bi, In, Al) | 67.00 | 66.95 |
| Sulfur | 0 | 0.05 |
| Indium Hydroxide | 0.019 | 0.019 |
| 0.1N KOH | 1.34 | 1.34 |
| Carbopol (C940) | 0.475 | 0.475 |
| ZnO | 0.935 | 0.935 |
| $Na_2SiO_3$ | 0.093 | 0.093 |
| 37% KOH | 30.138 | 30.138 |

The zinc alloy, sulfur, indium hydroxide, and potassium hydroxide (0.1 N) were mixed together, then added to a gel that had been formed by blending together the other components. Thus, as seen in Table 1, the control anode is the same in all respects as the anode with the elemental sulfur, except that the control contains no added elemental sulfur, thus having 67% by weight zinc whereas the experimental sample contains 66.95 weight percent zinc and 0.05 weight percent elemental sulfur. FIG. 2 shows a comparison of discharge curves of two samples of zinc anodes, one mixed with elemental sulfur and one without, at a discharge rate of 250 milliAmps per gram of zinc (mA/g) in a flooded test cell. The discharge, in milliAmp hours per gram of zinc (mAh/g), is plotted against the anode potential in volts. Line 40 shows the discharge characteristics of the test cell with the zinc "control" anode having no added elemental sulfur. Line 42 shows the discharge characteristics of the experimental zinc anode with elemental sulfur added. At any depth of discharge, the voltage of the experimental anode is higher than the voltage of the control anode. The results demonstrate that the discharge performance of the anode with the elemental sulfur is significantly improved over that of the control anode as evidenced by the data which shows that the discharge capacity of the experimental anode is about 30% greater than the discharge capacity of the control zinc anode. After discharge, the discharge product found on the zinc anode surface consisted essentially of zinc oxide. No zinc hydroxide was detected on the anode surface.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. An electrochemical cell comprising an aqueous electrolyte and an anode, said anode having an electrochemically active material and elemental sulfur wherein said active material comprises zinc alloy.

2. The electrochemical cell defined in claim 1, wherein said aqueous electrolyte is an alkaline electrolyte.

3. The electrochemical cell defined in claim 2, wherein said aqueous electrolyte comprises potassium hydroxide (KOH).

4. The electrochemical cell defined in claim 1, wherein said anode comprises from about 0.015% to about 0.30% elemental sulfur by weight relative to zinc in said anode.

5. The electrochemical cell defined in claim 4, wherein said anode comprises from about 0.03% to about 0.15% elemental sulfur by weight relative to zinc in said anode.

6. The electrochemical cell defined in claim 5, wherein said anode comprises from about 0.06% to about 0.09% elemental sulfur by weight relative to zinc in said anode.

7. The electrochemical cell defined in claim 6, wherein said anode comprises about 0.075% sulfur by weight relative to zinc in said anode.

8. A method of making an electrochemical cell comprising the steps of:
   providing a cathode;
   providing an alkaline electrolyte;
   providing ingredients sufficient to form au anode comprising zinc alloy;
   adding elemental sulfur to said anode ingredients to form an anode with sulfur therein; and
   putting said anode and cathode in contact with said electrolyte.

9. The method defined in claim 8, wherein said elemental sulfur is added to said anode ingredients in an amount of from about 0.015% to about 0.30% elemental sulfur by weight relative to zinc in said anode.

10. The method defined in claim 9, wherein said elemental sulfur is added to said anode ingredients in an amount of from about 0.03% to about 0.15% elemental sulfur by weight relative to zinc in said anode.

11. The method defined in claim 10, wherein said elemental sulfur is added to said anode ingredients in an amount of from about 0.06% to about 0.09% elemental sulfur by weight relative to zinc in said anode.

12. The method defined in claim 11, wherein said elemental sulfur is added to said anode ingredients in an amount of about 0.075% elemental sulfur by weight relative to zinc in said anode.

13. An electrochemical cell comprising:

a potassium hydroxide electrolyte; and an anode having a zinc alloy as its active ingredient and added elemental sulfur in an amount of from about 0.015% to about 0.30% by weight relative to zinc in said anode.

14. The electrochemical cell defined in claim 13, wherein said anode comprises from about 0.03% to about 0.15% elemental sulfur by weight relative to zinc in said anode.

15. The electrochemical cell defined in claim 13, wherein said anode comprises from about 0.06% to about 0.09% elemental sulfur by weight relative to zinc in said anode.

16. The electrochemical cell defined in claim 15, wherein said anode comprises about 0.075% sulfur by weight relative to zinc in said anode.

17. An electrochemical cell comprising an aqueous electrolyte and an anode having an active material and elemental sulfur, wherein the cell has an anode discharge product comprised primarily of zinc oxide.

18. An electrochemical cell comprising:

an alkaline electrolyte comprising potassium hydroxide (KOH);

an anode comprising a zinc-bismuth-indium-aluminum alloy and 0.075% elemental sulfur by weight relative to zinc in said anode; and a cathode comprising manganese dioxide, wherein said anode and said cathode are in contact with said electrolyte.

* * * * *